United States Patent [19]
Pilston

[11] 3,897,650
[45] Aug. 5, 1975

[54] LURE CONTAINER

[76] Inventor: Robert G. Pilston, 714 E. 7th Ave., Durango, Colo. 81301

[22] Filed: May 8, 1974

[21] Appl. No.: 468,213

[52] U.S. Cl. ............................................. 43/54.5 R
[51] Int. Cl. .......................................... A01k 97/06
[58] Field of Search ...................... 43/54.5 R, 57.5 R

[56] References Cited
UNITED STATES PATENTS

| | | | |
|---|---|---|---|
| 821,579 | 5/1906 | Austen | 43/54.5 R X |
| 2,548,080 | 4/1951 | Thorn | 43/54.5 R |
| 2,718,087 | 9/1955 | Cheesebrew | 43/57.5 R |
| 3,832,798 | 9/1974 | Pilston | 43/57.5 R |

*Primary Examiner*—Louis G. Mancene
*Assistant Examiner*—Peter K. Skiff
*Attorney, Agent, or Firm*—Phillip L. DeArment

[57] ABSTRACT

The container has an elongated tubular transparent body in which a lure can be stored. A rigid fastener is connected to the body by a swivel connector and provides for connection of the body to a fisherman such as by a buttonhole, belt, auxiliary chain, necklace, etc. A removable captive lid closes the open end of the body. When access to a lure is desired, the lid is removed and the body is pivoted about the swivel connection to turn the body upside down to permit the lure to fall from the container. After removal of the lure from the container, the body returns, by gravity, to its initial position due to the position of the swivel connector on the body. As an extension of the above, a multiple lure container is also disclosed which comprises a plurality of elongated transparent plastic tubes having a partition dividing each tube into two lure compartments. Captive lids close each end of the tubes. The tubes extend through and are supported by clamps which are aligned and fastened in a rigid channel. The channel is connected to a fisherman by a fastener swivelly connected to the channel.

14 Claims, 5 Drawing Figures

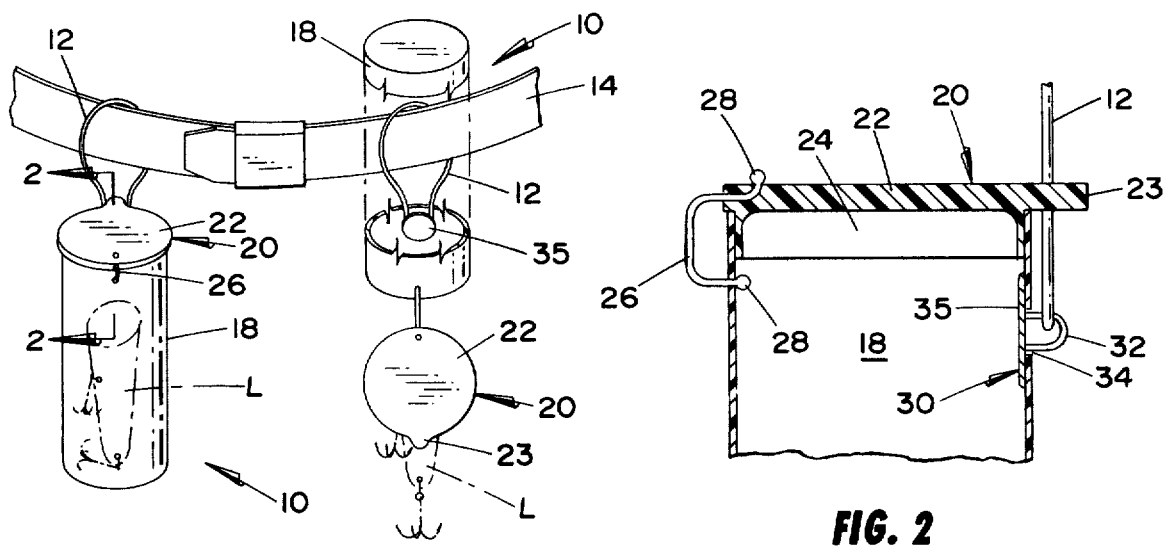
FIG. 1
FIG. 2
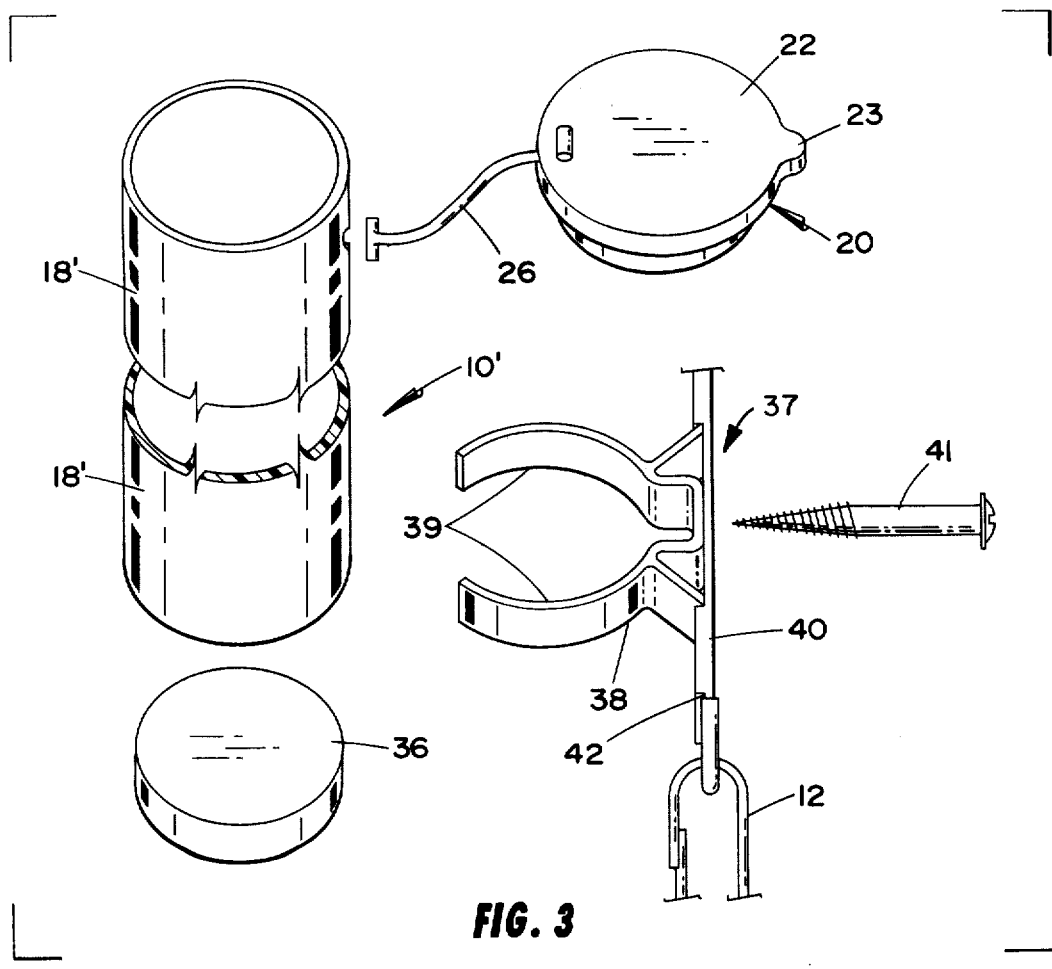
FIG. 3

LURE CONTAINER

RELATION TO PRIOR INVENTION:

The present invention is an improvement of my invention disclosed and claimed in copending application Ser. No. 366,001, filed June 1, 1973 U.S. Pat. No. 3,832,798, and titled "LURE CONTAINER".

BACKGROUND

The present invention relates to containers for storing, handling and displaying fishing lures and other articles. Handling, storage and access to fishing lures particularly plugs have been a problem for the fisherman due to the hooks associated with the plugs. For example, the hooks of the lure tend to snag various objects and become entangled such that it takes time to extricate a selected lure for use.

The prior art provides several different types of containers for fishing lures which provide partial solutions to these problems. For examples of related prior art solutions to these problems, see U.S. Pat. Nos. 2,693,662, 2,718,087, 2,729,913, 3,180,083 and 3,224,134. However, the known prior art, although solving part of the problem does not provide for individual storing of lures such as plugs which can be conveniently stored on the body of the fisherman, isolate the lures from the fisherman and can be easily manipulated to connect or disconnect a selected lure for use in fishing.

PREFERRED EMBODIMENTS

The present invention has as an object an inexpensive, lightweight lure container that can be readily attached to the fisherman and which supports a lure, such as a plug, in an individual envelop which protects the fisherman from the lure and the lure from damage and which is easily manipulated by the fisherman to permit access to the lure in the container to remove it for use and to replace it after the use is completed.

A further object of the present invention is to provide an elongated tubular transparent body appropriately sized to store a lure and which is secured to the fisherman by a fastener that is connected to the body via a swivel connector; the body has a captive removable lid closing the open end of the body such that the lure is completely enclosed and stored within the elongated body during non-use and when it is desired to use the lure, the lid is popped open by a thumb and the housing turned upside down to permit the lure to fall out the open end of the body.

A still further object of the present invention is to provide an inexpensive multiple lure container by supporting a plurality of elongated transparent tubes by clamps secured in a channel and each tube having a partition dividing it into two lure storage compartments and a captive hinged lid closing each compartment and the channel is secured to a fisherman by a fastener that is swivelly connected to the channel to permit manipulation of the tubes for loading and unloading a selected lure.

These and other objects will become apparent from the following description of preferred embodiments of the invention taken in accordance with the accompanying drawings and in which:

FIG. 1 is a perspective view of lure containers according to the present invention connected to a fisherman and showing one of the containers when storing a lure and the other during removal of a lure from the container;

FIG. 2 is a sectional view of a lure container according to the present invention taken substantially along line 2—2 of FIG. 1;

FIG. 3 is an exploded view of a lure container according to the present invention illustrating a modified arrangement of securing the fastener to the body of the tube;

Figure 4:
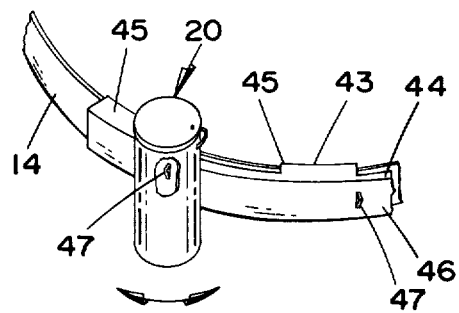
FIG. 4 is a perspective view of a modified means of securing the containers to a fisherman.

Referring to the drawings and initially to FIG. 1, lure containers 10 are illustrated connected by fasteners 12 to the belt 14 of a fisherman. The belt 14 can either be placed around the fisherman's neck (not shown) or around his waist as shown in FIG. 1 to support the containers 10 during use. The fastener or connecting device 12 may be of the "safety pin" type commonly used to support a shower curtain from its support rod. Obviously, fastener 12 can be secured to various convenient parts of the fisherman's attire.

The container 10 comprises a tubular, transparent plastic body 18. The body 18 is of tubular configuration and is sized such that a particular size lure, such as plug L, can fit within the confines of the body 18 while permitting the lure L to move relative to the body 18 with minimum interference. The lower end of the body 18 is closed and the open upper end is closed by an access means or lid 20. Lid 20 has a top portion 22 that extends radially beyond the body 18 and includes a flip tab 23 which is engageable by the thumb to open lid 20. Skirt 24 depending from top portion 22 is configured to snugly engage and completely close the open end of body 18 to protect the lure L from loss, dirt, etc. The friction fit holds the lid 20 in secured relationship to the body 18. The lid 20 has a filament 26 which secures the lid 20 to the body 18 such that when the lid 20 is removed, it does not become separated from the body 18. The filament 26 is connected to the body 18 and lid 26 by crossbars 28 connected to the filament ends and which abut the filament openings in the body and lid.

The lure container 10 is adapted to contain, store, and visually display lure L while depending from necklace or belt 14 as shown in FIG. 1. When lure L is to be removed, the fisherman removes cap 26 to open the top of the body portion 18. The body 18 is then pivoted about swivel connector 30, which connects fastener 12 to body 18, from a position illustrated by the left container 10 as viewed in FIG. 1 to the position represented by the right container 10 in FIG. 1, wherein lure L falls from body 18 into the waiting hand of the fisherman. After removal of lure L, the body 18 may be released and will return, due to gravity and locating swivel connector 30 above the center of gravity of the container 10, to the upright position represented by the left container 10 of FIG. 1.

Any suitable eyelet-type swivel connector may be used as connector 30. However, cost consideration make the illustrated button-type swivel connector preferable. Button 30 is assembled to body 18 by merely inserting eyelet 32 from the interior of body 18 through an opening 34 in body 18 until the enlarged head 35 abuts body 18. Opening 34 should be larger than the eyelet 32 to permit body 18 to pivot easily relative to the connector 30.

A modified lure container 10' is illustrated in FIG. 3 and comprises a transparent length of tubing comprising body 18'. One end of body 18' is closed by captive lid 20 as in lure container 10 illustrated in FIGS. 1 and 2. The other end of body 18' is closed by disc 36 which is inserted into the associated end of body 18' and is secured by clamping means 37.

Clamping means 37 comprises, preferably, a molded plastic clamp 38 as illustrated having spring arms 39, whose diameter is less than the diameter of body 18'. Arms 39 are forced around the outside of body 18' and exert clamping pressure on inserted disc 36 to hold the disc in position in body 18'.

The clamp 38 is received in a thin channel member 40. A threaded fastener 41 secures channel 40, clamp 38, body 18' and disc 36 in assembled relationship. End 42 of channel 40 is flat, may have a protective plastic shield insert thereon, and has an opening to receive pin fastener 12, as illustrated.

In use, body 18' is suspended so that lid 20 is on the bottom. Hence, to remove a lure, lid 20 is opened and the lure falls into the fisherman's hand. To load a lure into container 10', lid 20 is opened, body 18' is pivoted to place the open end up, the lure is inserted into body 18', lid 20 closed and the container 10' will return, by gravity, to its initial position.

FIG. 4 illustrates another attachment means 43 for securing selected lure containers 10 to the fisherman's apparel. Attachment means 43 comprises a molded flexible belt adapter 44 having a plurality of keepers 45 through which belt 14 is received. The front side 46 of adapter 43 has a plurality of compressable, arrow-shaped connectors 47 projecting therefrom which extend through opening 34 to swivelly secure the container 10 to adapter 44. Connectors 47 are spaced along face 46 a sufficient distance to permit one container to swivel without interference by the adjacent container. With such an arrangement, the containers 10 of FIG. 4 can be loaded and unloaded the same as illustrated in FIG. 1.

It should be apparent from the foregoing that lure containers are provided which can isolate and visibly display a lure in a manner convenient for use by the fisherman and which permits the lure to be easily removed from and returned to its container. Moreover, the construction of the container is such that it is relatively inexpensive to manufacture and is convenient to be supported from the fisherman's apparel while he is fishing without undue interference with the fishing operation. It should also be appreciated that container 10 provides a convenient manner of storing lures other than during time of use such as a package for sale of the lures.

Figure 5:
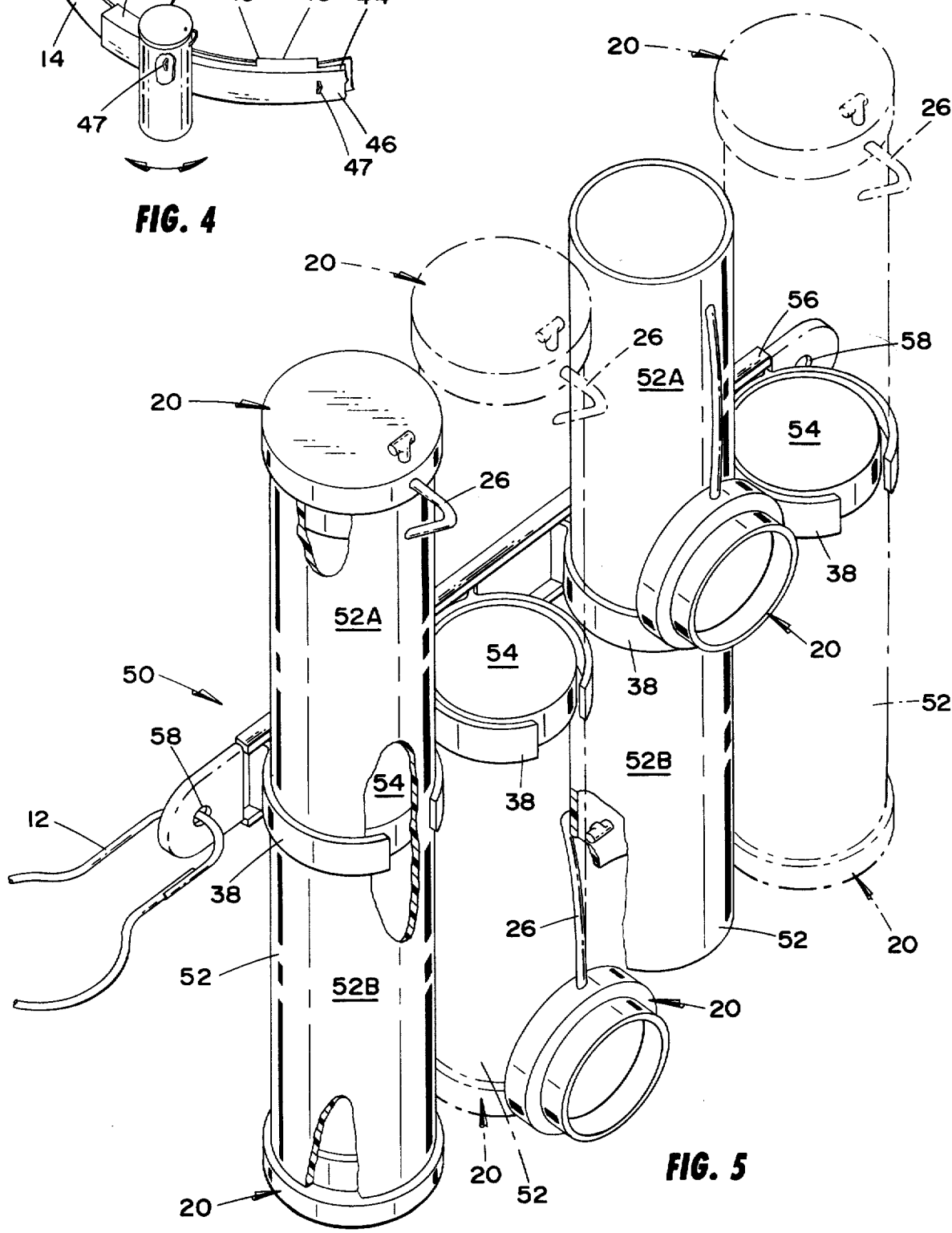
FIG. 5 is a perspective view of the multiple lure container according to the present invention.

A multiple-type lure container 50 is illustrated in FIG. 5 and comprises a plurality of elongated open ended plastic tubes 52. Tubes 52 are of a length to receive a partition disc 54 which divides tubes 52 into two separate and discrete lure containing compartments 52A and 52B. Partition disc 54 is sized to snugly fit into tube 52. Tubes 52 are secured by clamps 38 (see FIG. 3) that are secured in an elongated channel 56, similiar to channel 40 in FIG. 3. The tubes 52, clamps 38, partitions 54 and channel 56 are secured in the assembled relationship illustrated by a plurality of threaded fasteners, as in FIG. 3.

The assembly of multiple lure container 50 is completed by securing a lid 20 to each end of each tube 22 by inserting the T-shaped connectors 28 through openings provided in opposite areas of each of the ends of tube 52. This connection arrangement permits each lid 20 to be opened by the same thumb regardless of which compartment is being opened. Fastener 12 is selectively hooked into one of two openings 58 provided in opposite ends of channel 56 depending on whether the user is right or left handed.

It should be apparent that the lure container 50 provides visual access to all the lures stored in the individual plastic tubes 52A and 52B. Moreover, the multiple lure container emodiment illustrated, has as its object to utilize commercially available parts and thus reduce tooling and manufacturing costs with a view of obtaining a lower selling price.

The tubes 52 may include tubes 52 of various lengths to accommodate different size lures, if desired. Moreover, if greater number of lure compartments 52A and 52B are desired, two containers 52 may be arranged with their channels 56 abutting and be secured in such relationship by use of an appropriate fastener extending through the channels 56.

What I claim is:

1. A lure container adapted to be dependently supported from a fisherman to protect the fisherman from the hooks of the lure and protect the lure from damage and snagging other objects comprising an elongated tubular transparent body having one end open and adapted to envelop and contain a lure, a removable lid engageable with the open end of said body to open and close the body and connector means for securing the body to a fisherman including a rigid swivel connector which permits rotation of said body from a first position in which the open end thereof is up to a second position in which the open end is down to permit loading and removal of a lure from the body.

2. The lure container as defined in claim 1, wherein said swivel connection is located intermediate the center of gravity of the container and the open end of said body to permit gravity return of said body from said second to said first positions.

3. The lure container as defined in claim 1, wherein said swivel connector includes a part directly connected to said body.

4. The lure container as defined in claim 3, wherein said swivel connector includes an eyelet on the exterior of said body and abutment means connected to said eyelet and arranged on the interior of said body and a fastener connected to said eyelet and being connectable and disconnectable to the apparel of a fisherman.

5. The lure container as defined in claim 1, further comprising a flexible belt adapter adapted to receive and be supported by a belt, and connector means operatively associated with said adapter and said body for providing for rotational movement of said body relative to said adapter.

6. The lure container as defined in claim 1, wherein said connecting means includes a rigid base supporting said body, a rigid swivel connector at one end portion of said base and including an eyelet, and fastener means engageable with said eyelet and being connectable and disconnectable with the apparel of a fisherman.

7. The lure container as defined in claim 6, further including means for rigidly securing said body to said base at an area of said body intermediate the ends thereof.

8. The lure container as defined in claim 7, further including a partitioning disc located intermediate the ends of said body and dividing the body into two lure compartments, and the other end of said body also being opened, and a lid for closing said other end whereby access is provided to both compartments.

9. The lure container as defined in claim 8, wherein said container includes a plurality of bodies supported by said base.

10. A lure container adapted to be dependently supported from a fisherman to protect the fisherman from the hooks of the lure and protect the lure from damage and snagging other objects comprising a plurality of elongated, tubular, transparent bodies having open ends and adapted to receive and contain fishing lures, a rigid base supporting said bodies, a lid engageable with each of said open ends of said bodies and connector means for securing said base to the apparel of a fisherman including a rigid swivel connector at one end portion of said base to permit said base and bodies to rotate to load and empty a selected body.

11. The lure container as defined in claim 10, further including support means for supporting said bodies intermediate their ends on said base, the other ends of said bodies being open, lids engageable with said other open ends, and a partition in each body intermediate said ends to divide each body into two lure compartments.

12. The lure container as defined in claim 11, wherein said support means comprises a plurality of clamps frictionally engaging a portion of the circumference of each associated body and fastener means for securing said clamps to said base.

13. The lure container as defined in claim 11, further including means connecting the lids of each body to opposite portions of the ends.

14. The lure container as defined in claim 10, wherein said swivel connector comprises an eyelet on said base and securing means engaging said eyelet and being connectable with the apparel of a fisherman.

* * * * *